(No Model.)
A. L. RIKER.
MOTOR MOUNTING FOR ELECTRICALLY DRIVEN FANS.
No. 483,582. Patented Oct. 4, 1892.
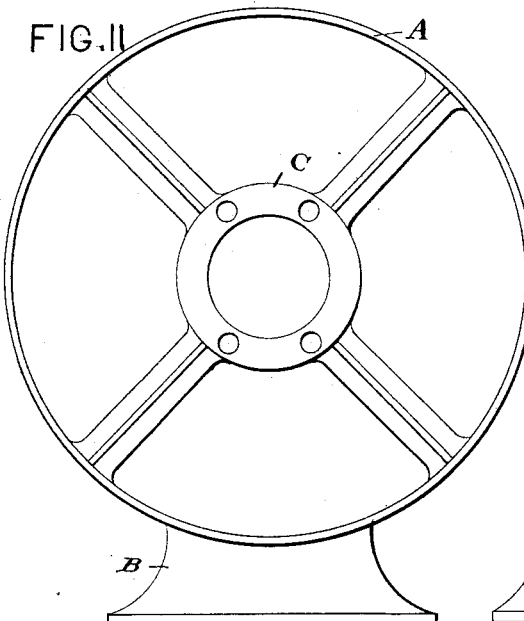
FIG. II.
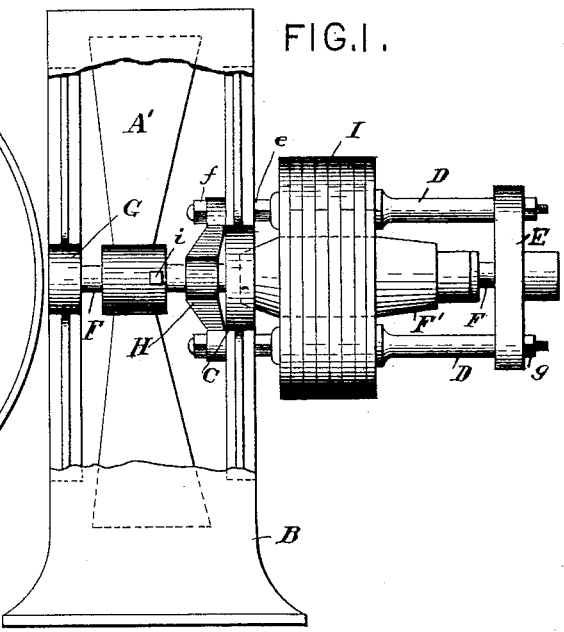
FIG. I.
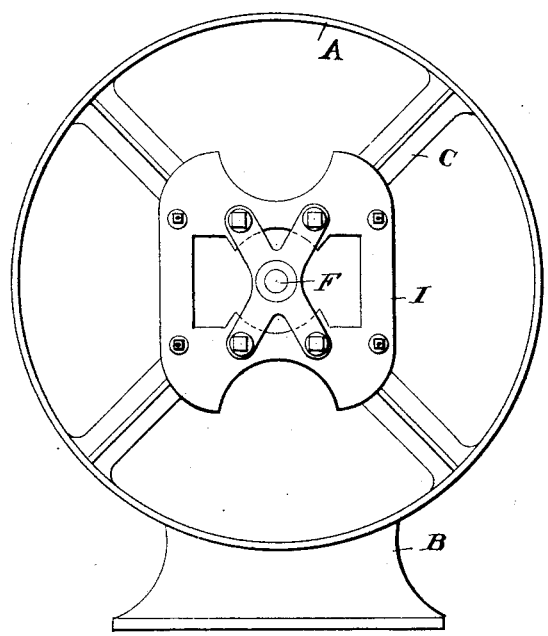
FIG. III.
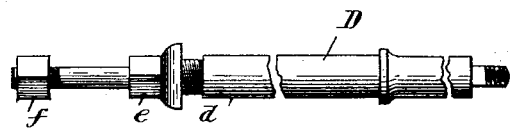
FIG. IV.
Witnesses:
Inventor,
Andrew L. Riker,
By Pollok & Mauro,
his Attorneys.
THE NORRIS PETERS CO., PHOTO-LITHO., WASHINGTON, D. C.

UNITED STATES PATENT OFFICE.

ANDREW L. RIKER, OF NEW YORK, N. Y.

MOTOR-MOUNTING FOR ELECTRICALLY-DRIVEN FANS.

SPECIFICATION forming part of Letters Patent No. 483,582, dated October 4, 1892.

Application filed December 22, 1891. Serial No. 415,920. (No model.)

*To all whom it may concern:*

Be it known that I, ANDREW L. RIKER, of New York city, in the State of New York, have invented a new and useful Improvement in Motor-Mountings for Electrically-Driven Fans, which improvement is fully set forth in the following specification.

This invention has reference to the combination of a fan or ventilating-wheel and the directly-connected motor whereby the same is driven; and it consists in the particular mode of mounting the motor and connecting the same with the fan and its support, whereby certain important advantages are attained, as hereinafter described.

It has been common heretofore to mount the armature of the driving-motor directly on the fan-shaft, and the present invention relates to structures of this character. In building electric fans and their motors prior to this invention the motor has been set inside the fan-casing, the armature and magnets being embraced between the arms or side framework, which support the bearings of the fan and armature-shaft. It has been found when repairs to any part of the apparatus become necessary that great difficulty, delay, and inconvenience are encountered in getting access to the part to be repaired. In such case it is necessary to dismember the entire structure, and, moreover, when the parts are to be reassembled the same care must be exercised to secure the proper alignment of the magnets and shaft as in the original construction of the apparatus. It is of great practical importance to avoid these difficulties, and their avoidance is the object of the present invention, according to which the fan casing or frame is provided on one side with a central ring or plate having a central opening, which ring or plate is permanently bolted to the other parts of the frame. The motor is applied to the outside of this ring-plate, being secured thereto by bolts passing through the pole portion or other convenient part of the magnet-frame. These bolts serve, also, to hold together the flat sheets or plates of which the magnet-frame is composed. The outer ends of the bolts support a casting, which constitutes or carries one of the journal-bearings of the shaft and which serves, also, to give solidity to the entire structure. When built up in this way, the stationary parts of the motor can be removed entire (without disturbing the fan or armature) by unscrewing the nuts on the inner ends of the bolts, and can again be quickly replaced in proper alignment when the necessary repairs are made. The armature and shaft can likewise be removed without disturbing the magnets by detaching the outer bearing-plate and loosening the set-screw which secures the fan to the shaft.

The principle of the invention and the details of construction which are included therein will be explained in connection with the accompanying drawings, in which—

Figure I is a side elevation of the structure, part of the fan-casing being removed. Fig. II is a detail in elevation showing the ring-plate which forms one side of the fan-casing. Fig. III is an end view of the framework of the structure, portions of the motor being omitted; and Fig. IV is a detail view of one of the motor-supporting bolts.

A represents the circular casing of the fan A', said casing being mounted on the base or pedestal B, which supports the entire structure.

C is the side plate or frame, consisting of a central ring-shaped portion provided with radiating arms, whereby the said plate or frame is attached to the casing A. The magnet-frame is secured to the outside of this ring-plate by means of the bolts D, which are all alike in construction. They pass, as shown, through the pole portions I of the magnet-frame, which is preferably of the laminated form. Bolts D are provided with shoulders *d*, which bear against the front side of the magnet-frame. Each bolt has in the rear of the magnet-frame a clamping-nut *e*, faced true on each end, by which the plates composing the magnet-frame are clamped against shoulders *d*. The inner threaded ends of the bolts which pass through ring-plate C are somewhat reduced in diameter, and the nuts *f* clamp the ring-plate against the rear faces of the nuts *e*. The bolts D project forwardly beyond the magnet-frame, and to the ends thereof is secured by nuts *g* the bearing-plate E for the outer end of shaft F. The armature F' is built upon this shaft and lies, as shown, outside of the ring-plate C. The inner end of the shaft F is supported in a bearing G, which is usually made adjustable, and in case of large structures it is preferable to provide an intermediate bearing-plate H, which is attached to the ring-plate C by means of the bolts D, Fig. I.

In putting the structure together the plates composing the magnet-frame are assembled upon the bolts D and secured in their proper position by means of the nuts e, and then attached to the ring-plate C by the nuts f. The shaft F', with the armature built thereon, is then passed through the ring-plate and hub of the fan, and the outer bearing-plate E is put in position and secured by nuts g.

It will be readily understood that by removing nuts f the magnets and their frame, with the bolts D, and in fact all the stationary parts of the motor, can be detached from the framework without dismounting the fan or armature, and that when these parts are replaced there will be no need of adjustment to bring them into alignment with the shaft, as this is effected by simply tightening the nuts f, so as to clamp the ring-plate against the faces of the nuts d. If repairs are required to the armature, it will not be necessary to remove the magnets, since access to the former can be had by unscrewing the end nuts g, loosening the set-screw i, which holds the fan on the shaft F, and detaching the plate G.

In addition to the advantages pointed out above, it will be observed that in the structure described the electrical connections of the motor are more conveniently reached than when the motor is inclosed within the frame of the fan, according to the plan of construction heretofore followed.

While the precise details of construction herein described and shown in the accompanying drawings are found to be of practical utility in carrying out the invention, it will be obvious that these may be modified without changing, essentially, the character of the said invention or departing from the spirit thereof.

I claim as my invention and desire to secure by Letters Patent—

1. The combination of a fan, a casing surrounding the same and mounted on a suitable support, a ring-plate on one side of the casing and forming part thereof, an electromotor having its frame secured by detachable bolts to the outside of said ring-plate and wholly supported thereby, and a shaft carrying the armature of said motor and also the fan, said shaft passing freely through said plate and having a removable journal-bearing at its outer end, so that the shaft and magnet-frame are each removable without disturbing the other, substantially as set forth.

2. A combined ventilating-fan and driving-motor comprising, in combination, the following elements: a casing surrounding the fan, a ring-plate at one side of the casing, a magnet-frame on the outside of said ring-plate, bolts secured by nuts to said ring-plate and extending outwardly therefrom, a magnet-frame supported and also held together by said bolts, a removable journal-bearing on the outer extremity of said bolts, and a shaft passing freely through said ring-plate and supporting on one side thereof the fan and on the other side thereof the armature of the motor, substantially as described.

In testimony whereof I have signed this specification in the presence of two subscribing witnesses.

ANDREW L. RIKER.

Witnesses:
DANIEL T. O'BRIEN,
E. RITZEMA DE GROVE.